(12) United States Patent
McInerny

(10) Patent No.: US 6,453,079 B1
(45) Date of Patent: Sep. 17, 2002

(54) METHOD AND APPARATUS FOR DISPLAYING REGIONS IN A DOCUMENT IMAGE HAVING A LOW RECOGNITION CONFIDENCE

(75) Inventor: Michael J. McInerny, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 41 days.

(21) Appl. No.: 09/364,455

(22) Filed: Jul. 11, 2000

Related U.S. Application Data

(62) Division of application No. 08/900,547, filed on Jul. 25, 1997, now abandoned.

(51) Int. Cl.[7] ................................................. G06K 9/03
(52) U.S. Cl. ..................................................... 382/311
(58) Field of Search ................................. 382/230, 231, 382/309, 310, 311; 400/63, 74; 707/5, 6; 700/87, 92, 93, 530

(56) References Cited

U.S. PATENT DOCUMENTS

| | | | |
|---|---|---|---|
| 4,674,065 A | 6/1987 | Lange et al. ................ 364/900 |
| 4,773,039 A | 9/1988 | Zamora ....................... 364/900 |
| 4,864,502 A | 9/1989 | Kucera et al. ............... 364/419 |
| 5,206,949 A | 4/1993 | Cochran et al. ............. 395/600 |
| 5,359,673 A | 10/1994 | de La Beaujardiere ....... 382/40 |
| 5,434,929 A * | 7/1995 | Beernink et al. ............ 382/187 |
| 5,440,481 A | 8/1995 | Kostoff et al. ......... 364/419.08 |
| 5,541,836 A | 7/1996 | Church et al. ......... 364/419.07 |
| 5,625,711 A * | 4/1997 | Nicholson et al. .......... 382/224 |
| 5,625,721 A * | 4/1997 | Lopresti et al. ............. 382/309 |
| 5,724,457 A * | 3/1998 | Fukushima .................. 382/311 |
| 5,787,197 A * | 7/1998 | Beigi et al. .................. 382/187 |
| 5,806,068 A * | 9/1998 | Shaw et al. .................. 707/103 |

* cited by examiner

Primary Examiner—Andrew W. Johns
(74) Attorney, Agent, or Firm—Blaney, Harper, Jones, Day, Reavis & Pogue

(57) ABSTRACT

A document image that is the source of Optical Character Recognition (OCR) output is displayed. Recognition confidence parameters are determined for regions of the document image corresponding to words in the OCR output. The regions are displayed in a manner (e.g., highlighted in various colors) that is indicative of the respective recognition confidence parameter. Preferably, a user can select a region of the displayed document image. When the region is selected, text of the OCR output corresponding to the selected region is displayed in a pop-up menu.

12 Claims, 5 Drawing Sheets

IMAGE DISPLAY

WE THE PEOPLE OF THE UNITED STATES.
IN ORDER TO FORM A MORE PERFECT
UNION, ESTAB 302 304 JSTICE. ENSURE
DOMESTIC TRA FONN TY. PROVIDE FOR
THE COMMON D FAUN . PROMOTE THE
                FORM
GENERAL WELF FAIN ND SECURE THE
                FAWN
BLESSINGS OF FERN Y TO OURSELVES
AND OUR POSTERITY, DO ORDAIN AND
ESTABLISH THIS CONSTITUTION FOR
THE UNITED STATES OF AMERICA.

FIG. 3a

METHOD AND APPARATUS FOR DISPLAYING REGIONS IN A DOCUMENT IMAGE HAVING A LOW RECOGNITION CONFIDENCE

This application is a divisional of patent application Ser. No. 08/900,547 filed Jul. 25, 1997, now abandoned.

TECHNICAL FIELD

The present invention relates to optical character recognition and, more particularly, to a method and apparatus for detecting errors in the output of optical character recognition.

1. Background Art

Acquisition of text and graphics from paper documentation is a significant issue among many industries. For example, a publishing company may print hundreds or thousands of academic papers over the course of a year. Often the publishing company works from paper documents, which must be input into the computer equipment of the publishing company. One conventional approach is to hire keyboardists to read the paper documents and type them into the computer system. However, keying in documents is a time-consuming and costly procedure.

Optical character recognition (OCR) is a technology that promises to be beneficial for the publishing industry and others, because the input processing rate of an OCR device far exceeds that of a keyboardist. Thus, employees of the publishing company typically work from scanned documents, which are converted into a computer-readable text format, such as ASCII, by an OCR device.

However, even the high recognition rates that are possible with modern OCR devices (which often exceed 95%) are not sufficient for such industries as the publishing industry, which demands a high degree of accuracy. Accordingly, publishing companies hire proofreaders to review the OCR output by hand.

Proofreading OCR output by hand, however, is very time consuming and difficult for people to do. A person must comb through both the original paper document and a print out or screen display of the OCR output and compare them word by word. Even with high recognition rates, persons proofreading the OCR output are apt to become complacent and miss errors in the text.

Another conventional option is to spell check the resultant computer-readable text. However, not all recognition errors result in misspelled words. In addition, an input word may be so garbled that the proofreader must refer back to the paper text during the spell checking operation. Once the proofreader has looked at the paper text and determined the correct word, the correct word must be keyed into the OCR output text. This approach has been found to be time-consuming and somewhat error-prone.

2. Disclosure of the Invention

There exists a need for facilitating human proofreading of OCR output. In specific, there is a need for reducing the time consumed while proofreading the OCR output.

These and other needs are met by the present invention, in which characters in a document image from an original paper document are recognized (e.g., through OCR) to produce a document text. Regions in the document image that correspond to words in the document text are determined, and recognition confidence parameters are determined for each region. The regions in the document image are displayed in a manner indicative of the respective recognition parameter.

Preferably, the user can select a position in the document image. A selected word is determined according to the region of the document that includes the position in the document image and display, for example in a pop-up menu. In addition, the recognition confidence parameters may be compared to more than one threshold and displayed in a color that corresponds to the thresholds that have been exceeded.

Additional objects, advantages, and novel features of the present invention will be set forth in part in the detailed description which follows, and in part will become apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 3(a) is an exemplary screen display according to an embodiment of the present invention.

DETAILED DESCRIPTION OF THE INVENTION

A method and apparatus for error detection of OCR output are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
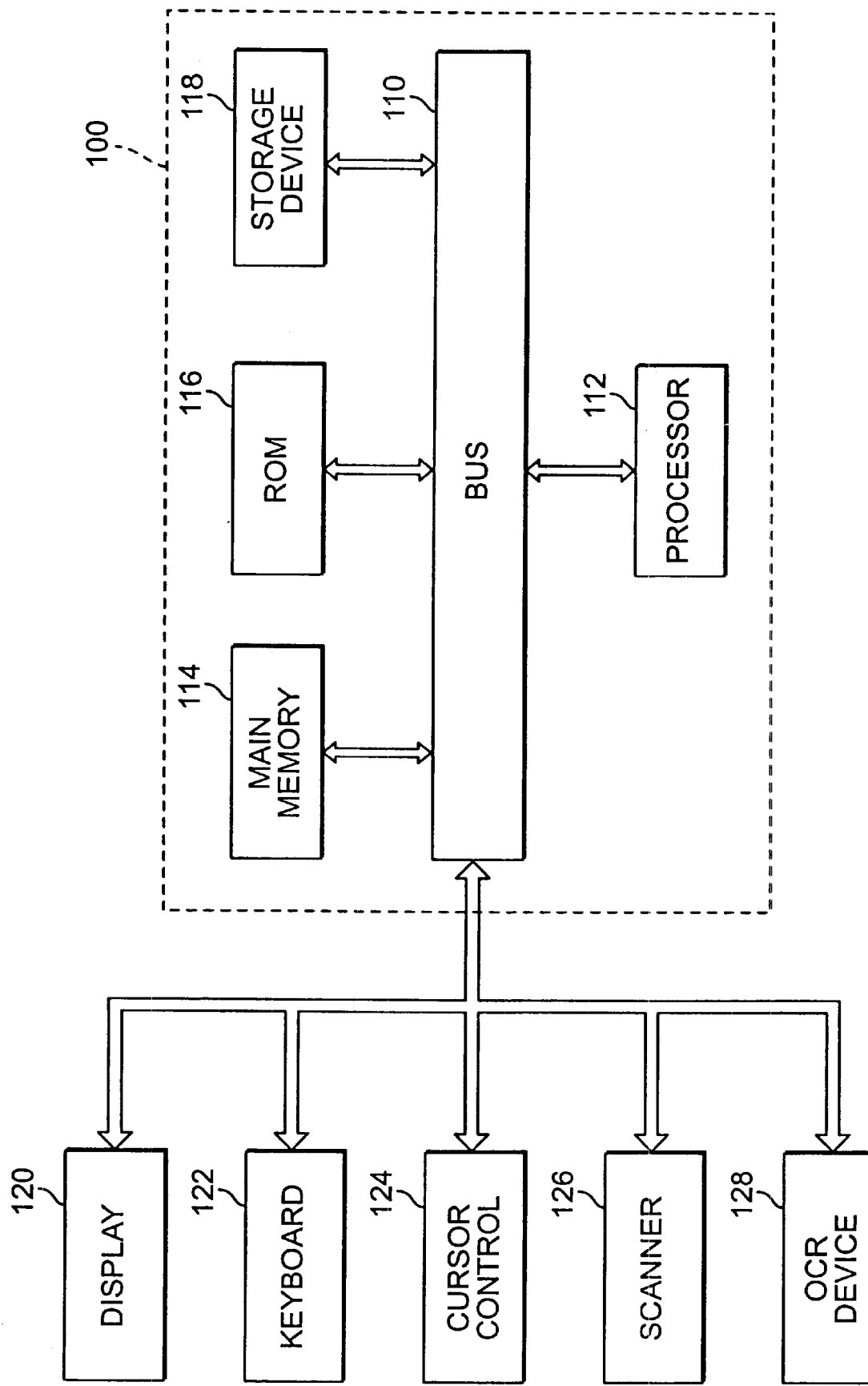
FIG. 1 is a high-level block diagram of a computer system with which the present invention can be implemented.

Referring to FIG. 1, it is a block diagram of a computer system 100 upon which an embodiment of the present invention can be implemented. Computer system 100 includes a bus 110 or other communication mechanism for communicating information, and a processor 112 coupled with bus 110 for processing information. Computer system 100 further comprises a random access memory (RAM) or other dynamic storage device 114 (referred to as main memory), coupled to bus 110 for storing information and instructions to be executed by processor 112. Main memory 114 also may be used for storing temporary variables or other intermediate information during execution of instructions by processor 112. Computer system 100 also comprises a read only memory (ROM) and/or other static storage device 116 coupled to bus 110 for storing static information and instructions for processor 112. A data storage device 118, such as a magnetic disk or optical disk and its corresponding disk drive, can be coupled to bus 110 for storing information and instructions.

Input and output devices can also be coupled to computer system 100 via bus 110. For example, computer system 100 uses a display unit 120, such as a cathode ray tube (CRT), for displaying information to a computer user. Computer system 100 further uses a keyboard 122 and a cursor control 124, such as a mouse. In addition, computer system 100 may employ a scanner 126 for converting paper documents into a computer readable format. Furthermore, computer system 100 can use an OCR device 128 to recognize characters in a document image produced by scanner 126 or stored in main memory 114 or storage device 118. Alternatively, the functionality of OCR device 128 can be implemented in software, by executing instructions stored in main memory 114 with processor 112. In yet another embodiment, scanner 126 and OCR device 128 can be combined into a single device configured to both scan a paper document and recognize characters thereon.

The present invention is related to the use of computer system 100 for detecting errors in OCR output. According to one embodiment, error detection of OCR output is performed by computer system 100 in response to processor 112 executing sequences of instructions contained in main memory 114. Such instructions may be read into main memory 114 from another computer-readable medium, such as data storage device 118. Execution of the sequences of instructions contained in main memory 114 causes processor 112 to perform the process steps that will be described hereafter. In alternative embodiments, hard-wired circuitry may be used in place of or in combination with software instructions to implement the present invention. Thus, the present invention is not limited to any specific combination of hardware circuitry and software.

Compound Document Architecture

Figure 2A:
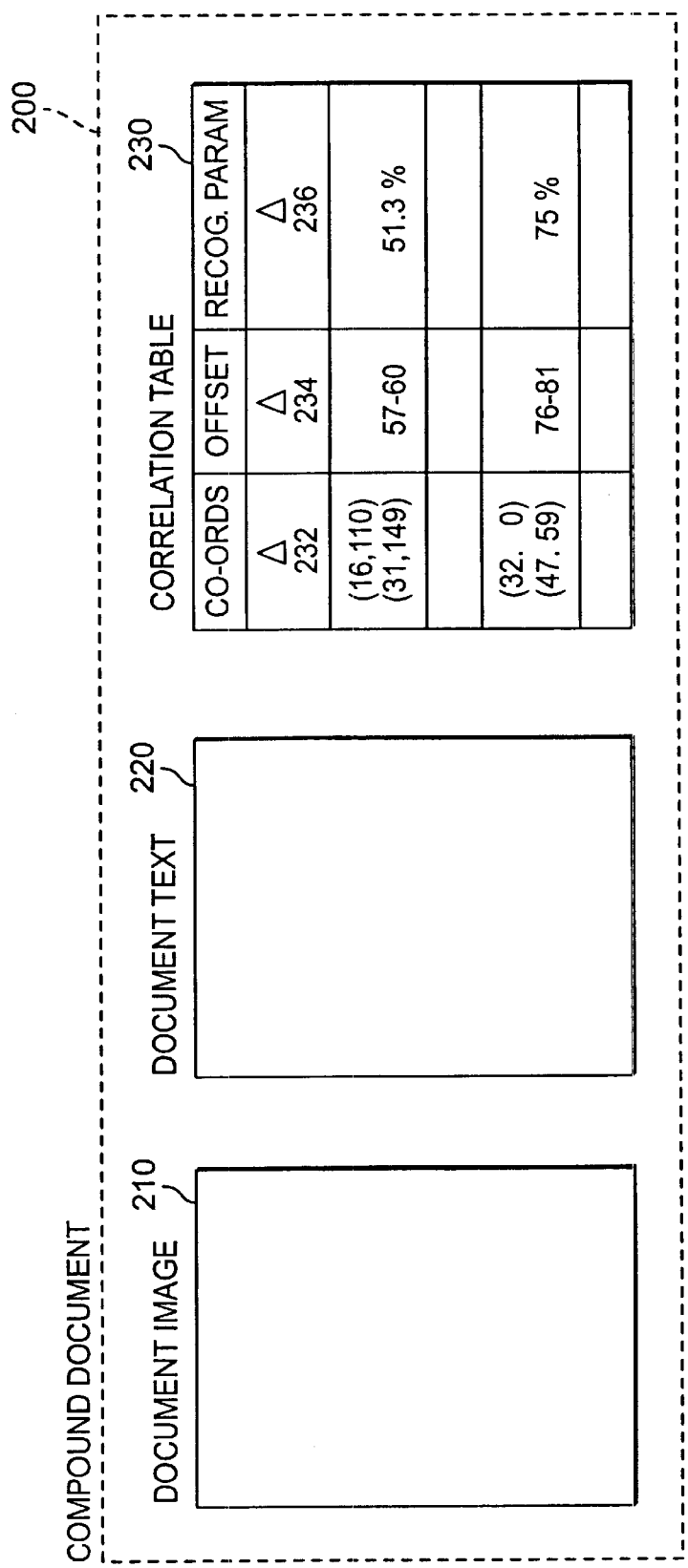
FIG. 2(a) is a block diagram of the architecture of a compound document.

A compound document contains multiple representations of a document and treats the multiple representations as a logical whole. A compound document 200, shown in FIG. 2(a), is stored in a memory, such as main memory 114 or storage device 118 of computer system 100.

Compound document 200 comprises a document image 210, which is a bitmap representation of a document (e.g., a TIFF file produced from scanner 126). For example, a copy of the U.S. Constitution on paper may be scanned by scanner 126 to produce an image of the Constitution in document image 210.

A bitmap representation is an array of pixels, which can be monochrome (e.g., black and white) or polychrome (e.g., red, blue, green, etc.). Thus, the location of a rectangular region in the document image 210 can be identified, for example, by the coordinates of the upper left corner and the lower right corner of the rectangle. In the example of scanning the U.S. Constitution, the first letter of the word "form" in the Preamble, may be located in a rectangle with an upper left coordinate of (16, 110) and a lower right coordinate of (31, 119). Accordingly, the last of letter of the same word would be located with the coordinates (16, 140) and (31, 149).

Figure 2B:
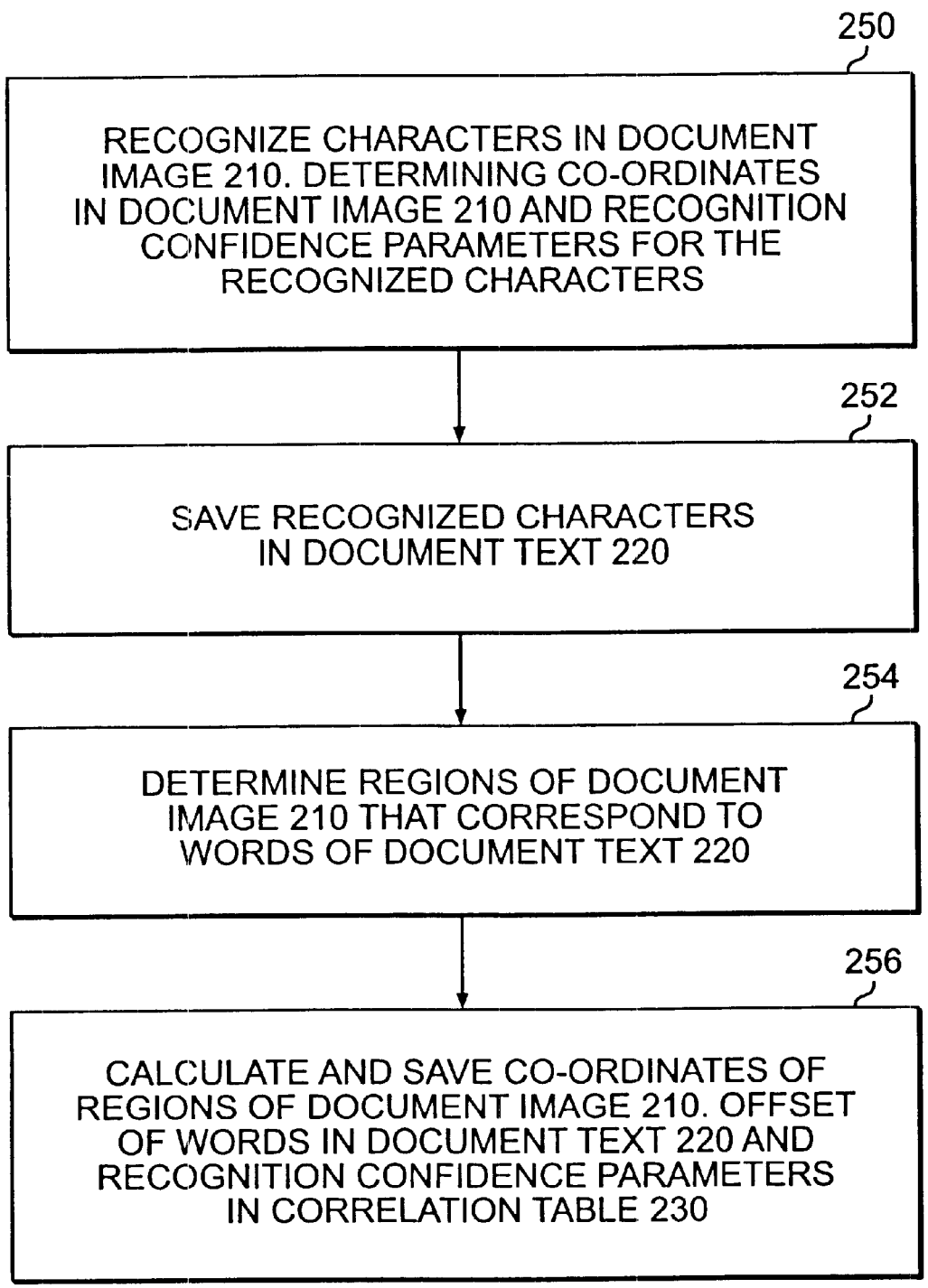
FIG. 2(b) is a flow chart illustrating the operation of creating a compound document.

Compound document 200 also comprises a document text 220 and a correlation table 230, which may be produced by the method illustrated in the flow chart of FIG. 2(b). A document text 220 is a sequence of 8-bit or 16-bit bytes that encode characters in an encoding such as ASCII, EBCDIC, or Unicode. Thus, characters in the document text 220 can be located by offsets into the document text 220. In the example, the first character of the word "form" in the Preamble to the U.S. Constitution is at offset 57, and the last character of the word is at offset 60.

Referring to FIG. 2(b), characters in document image 210 are recognized in step 250, by OCR device 128 or an equivalent thereof, and saved in step 252 in document text 220. OCR device 128 is also configured to output in step 250 the coordinates in the document image of the characters that are recognized. Thus, recognized characters at a known offset in the document text 220 can be correlated with regions of the document image 210. In the example, the character at offset 57 is correlated with the region defined by the coordinates (16, 110) and (31, 119).

In addition, some implementations of OCR device 128, known in the art, are configured to output a recognition confidence parameter that indicates the probability that the recognition is correct. For example, with certain fonts, the letters "rn" in document image 210 might be recognized as the letter "m" at a probability that can be estimated. In this case, the OCR device 128 might, for instance, output a recognition confidence parameter of 60% for the pair of characters.

In step 254, words in the document text 220 are identified, for example, by taking the characters between spaces as words. In step 256, the regions in the document image 210 that correspond to the characters of the words are merged into one region corresponding to an entire word of the document text 220. In one embodiment, the region of document is defined as a rectangle with the most upper left coordinate and the most lower right coordinate of the coordinates of the regions corresponding to the individual characters. For example, the region corresponding to the word "form" in the Preamble is defined by a rectangle with the coordinates (16, 110) and (31, 149). Alternatively, a list of the coordinates for all the underlying characters may be saved, especially for documents with mixed-size characters.

When a word has been identified, a recognition confidence parameter is calculated for the word from the recognition confidence parameters of the underlying characters or pairs of characters. Preferably, the recognition confidence parameter for a word is computed by multiplying the individual character-based recognition confidence parameters together. In the example of recognizing the word "form", the letters "f" and "o" may have very high recognition confidence parameter, (e.g., 95% and 90%), but the "rm" pair may only have a 60% recognition confidence parameter. Multiplying these recognition confidence parameters together yields an overall recognition confidence parameter of 51.3%. Alternatively, other computations, for example, the minimum recognition confidence parameter for the word (e.g., 60%), may be used.

Information about each word of document text 220 is saved in step 256 in correlation table 230, so that regions of document image 210 can be correlated with words in document text 220. Specifically, correlation table 230 stores a pair of coordinates 232 defining the region in document image 210, a pair of offsets 234 defining the location of the word in document text 220, and a recognition confidence parameter 236 for the word. In the example, the word "form" would have a pair of coordinates 232 of (16, 110) and (31, 149), a pair of offsets 234 of 57 and 60, and a recognition confidence parameter 236 of 51.3%.

With correlation table 216, offsets 234 in document text 220 correspond to regions of document image 210 identified by coordinates 232, and vice versa. For example, given a coordinate of (23, 127), the co-ordinate 232 file of the correlation table 230 can be scanned to determine that the given coordinate is found in a word at offsets 57–60. The word at that offset in document text 220 can be fetched from document text 220, in the example, the word "form".

In the other direction, the correlation table 230 can be scanned for a given offset (e.g., 58) and the resulting rectangle with coordinates of (16, 110) and (31, 149) can be identified. Thus, the compound document architecture described herein provides a way of correlating the location of words in the document text 220 with corresponding regions of the document image 210.

Indicating Words with the Likelihood of Misrecognition

Figure 3B:
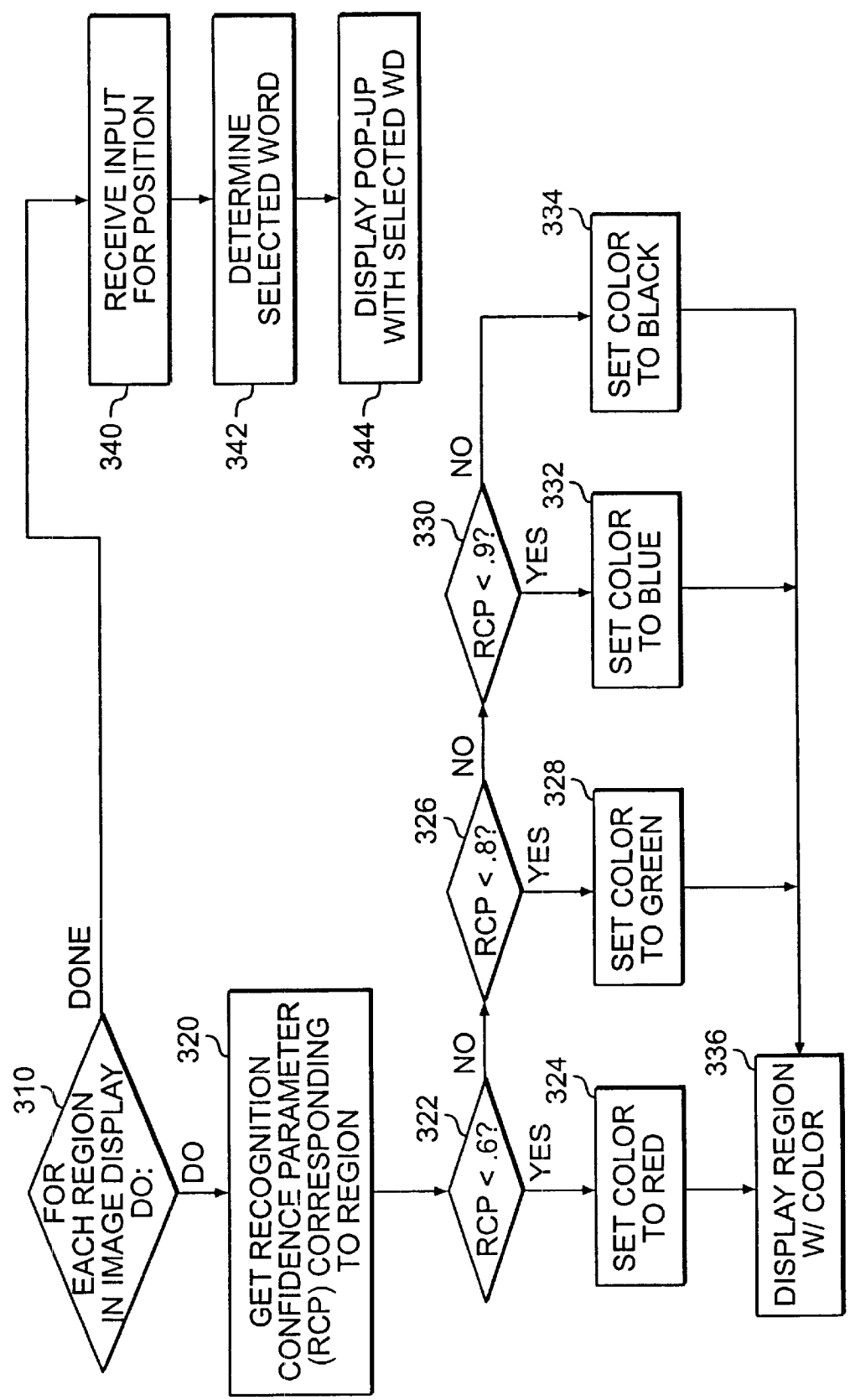
FIG. 3(b) is a flow chart illustrating the operation of the detecting errors in OCR output according to an embodiment.

In order to reduce the time involved in consulting the original paper document, the scanned image of the original paper document (i.e, document image 210) is displayed to the proofreader. In the example of scanning the U.S. Constitution, the scanned image of the Preamble may be displayed in image display 300 as shown in FIG. 3(*a*).

In the image display 300, words that have the greatest possibility of misrecognition are displayed in different manners. For example, highlighting with different colors, fonts, flashing, underlining, etc. These words can be determined by comparing the corresponding recognition confidence parameter 236 with a prescribed threshold. For example, words having a recognition confidence parameter 236 below 60% can be displayed in red, directing the user's attention to the words that are likely to be wrong.

In the example, the original word "form" was misrecognized as "form" with a recognition confidence parameter 236 of 51.3%. In this case, the black pixels in the region of image display 300 corresponding to the word "form" in document text 220 would be displayed as red pixels. In a preferred embodiment, the color of the background pixels around an image of a character is changed instead of the color of the pixels that comprise the character image.

In a preferred embodiment, moreover, the recognition confidence parameter 236 is compared to a plurality of thresholds to determine a respective display color for regions of document image 210 to form a "heat map" of recognized words. A heat map is a chart that employs a plurality of colors to signify the value of a parameter (e.g., frequency, temperature, or recognition confidence) at various points in a spectrum. The resulting "heat map" helps guide the user to the most problematic portions of the document image with respect to OCR output.

Referring to FIG. 3(*b*), a heat map is generated when the document image 210 is displayed in image display 300 by the loop controlled by step 310. Step 310 loops over each region that is to be displayed in image display 300. At step 320, the correlation table 230 is scanned to find the recognition confidence parameter 236 that corresponds to the displayed region. This parameter 236 is then successively compared to a plurality of thresholds, for example at 60%, 80%, and 90%.

Steps 322–334 illustrate the operation of the heat map display generation according to the exemplary thresholds of 60%, 80%, and 90%. First, the lowest threshold, 60%, is used as the threshold of comparison. If the recognition confidence parameter 236 is less than the threshold, then the color of the display region is set to red (step 324). In the example, the word "form" has a recognition confidence parameter 236 of 51.3%, hence is displayed in red. Other words, from FIG. 3(*a*), that are set to red are "general" and "Constitution".

Next in step 326, the next lowest threshold, 80%, is used as the threshold of comparison. If the recognition confidence parameter 236 is less than the threshold, then the color of the display region is set to green (step 328). In the example, the word "Union" has a recognition confidence parameter 236 of 75% and is therefore displayed in green. Other words, from FIG. 3(*a*), that are set to green are "ensure" and "secure".

In step 330, the last threshold, 90%, is used as the threshold of comparison. If the recognition confidence parameter 236 is less than the threshold, then the color of the display region is set to blue (step 332). Words from FIG. 3(*a*), that are set to blue are "more", "Tranquility" (partially obscured by pop-up menu 304), and "establish". On the other hand, if the recognition confidence parameter 236 exceeds all the thresholds, then the color is black, as the default color (step 334). When the color is set, the region is displayed with that color (step 336).

It will be appreciated that the number and colors for the thresholds may vary from implementation to implementation without departing from the spirit of the invention. For example, there may be one, two, three, or even ten thresholds. As another example, the choice of colors may vary (e.g., red, orange, yellow). In fact, display attributes other than coloring, such as blinking or underlining, may be employed. It is also to be understood that the thresholds and colors or other display attributes may be entered into a table and successively examined in a loop, rather hard-coding the branches as illustrated in the flow chart of FIG. 3(*b*).

Pop-up Menu Display

Error correction can be further facilitated by allowing the user to position the cursor 302 over a highlighted word in the document image 210 and cause the corresponding recognized text in document text 220 to be displayed nearby (e.g., in a pop-up menu display). For example, a user may position the cursor 302 over the red word "form" in the document image 210 and realize that the word was misrecognized as "form" when pop-up menu 304 is displayed. When the user corrects the word, the recognition confidence parameter 236 of corrected words can be reset to 100%, causing the display of the region of document image 210 corresponding to the corrected word to return to black.

After completing the loop controlled by step 310, the document image 210 is displayed as image display 300 on a display 120, such as a high-resolution monitor. In addition, a cursor 302 is displayed over the image display 300, and the user may position the cursor 302 with the cursor control 124, such as a mouse, track-ball, or joy-stick, over any part of the image display 300.

In step 340, the error detection apparatus receives input that selects a position on the image display 300. This input may be automatically generated by cursor control 124 whenever the cursor 302 is positioned over image display 300, or only when the user activates a button. In the latter case, when the user activates a button, the cursor control 124 sends the current position of the cursor 302 as input.

The position identified with the input received in step 340 is converted from the coordinate system of the image display 300 into the coordinate system of the document image 210, according to mapping techniques well-known in the art. Coordinate conversion is often necessary, because the document image 210 of a large document will not fit in a smaller image display 300. In the example illustrated in FIG. 3(*a*), the position of cursor 302 in image display 300 corresponds to coordinate (23, 127) of document image 210.

In step 342, the correlation table 230 is scanned for an entry specifying a region that encompasses the coordinate 232 derived from input received in step 340. In the example, coordinate (23, 127) is encompassed by the region defined by the co-ordinates (16, 110) to (31, 149). The pair of offsets 234 into document text 220 is fetched from the correlation table 230 entry and used to determine the selected word in document text 220. In the example, the corresponding offset pair is 57–60. This pair is used to extract a substring of characters positioned in document text 220 at the offsets in the offset range 234. Assuming, in the example, that the original word "form" in the Preamble was misrecognized as "form", the selected word at that offset range 234 would be "fonn".

In step 344, the selected word is displayed in a pop-up menu 304 near the cursor 302, so that the user can readily determine what the recognized characters were. Thus, in the example, pop-up menu 304 displays the selected word "form", so that when the pop-up menu is displayed, the user can decide by merely looking at the image display 300 of the document image 210 that the selected word is not correct.

According to one embodiment, when the cursor 302 is positioned over a word in the image display 300, the location of the cursor is automatically input, so that pop-up menu 304 is automatically displayed. Hence, a user can sweep the cursor 302 over displayed lines of text in image display 300 and compare the selected text that is automatically displayed in a standard position in pop-up menu 304. Thus, the user does not need to spend the time involved with looking at the paper original to decide whether a character was misrecognized by OCR device 128. If the words differ then the user can correct the text as described above.

Although this invention has been particularly described and illustrated with reference to particular embodiments thereof, it will be understood by those of skill in the art that changes in the above description or illustrations may be made with respect to for m or detail without departing from the spirit or scope of the invention.

What is claimed is:

1. A method of OCR output error detection, comprising the steps of:
   recognizing a plurality of characters in a document image;
   determining words from a sequence of said plurality of characters;
   determining regions of the document image that correspond to said words;
   correlating said words to said regions of said document image in a correlation table;
   determining a recognition confidence parameter for a plurality of words in said correlation table;
   defining a threshold level for said recognition confidence parameter; and
   displaying the regions of the document image containing a word having a recognition confidence parameter greater than said threshold level.

2. The method of claim 1, further comprising the steps of:
   receiving input that selects a region in the document image;
   determining a word from said correlation table that corresponds to said selected region; and
   displaying the word corresponding to said region.

3. The method of claim 2, wherein the step of displaying the word includes the step of displaying the word in a pop-up menu.

4. The method of claim 1, further comprising the steps of:
   determining a color for the regions having a recognition confidence parameter less than said threshold value; and
   displaying the regions of the document image having said color.

5. An apparatus for OCR output error detection, comprising:
   an OCR device for recognizing a plurality of characters in a document image;
   means for determining words from a sequence of said plurality of characters;
   means for determining regions of the document image that correspond to said words;
   means for correlating said words to said regions of said document image in a correlation table;
   means for determining a recognition confidence parameter for a plurality of words in said correlation table;
   means for defining a threshold level for said recognition confidence parameter; and
   a display for displaying the regions of the document image containing a word having a recognition confidence parameter greater than said threshold level.

6. The apparatus of claim 5, further comprising:
   a cursor control for receiving input that selects a region in the document image; and
   means for determining a word from said correlation table that corresponds to said selected region;
   wherein the display displays the word corresponding to said region.

7. The apparatus of claim 6, wherein the display displays the word corresponding to said region in a pop-up menu.

8. The apparatus of claim 5, further comprising:
   means for determining a color for the regions having a recognition confidence parameter less than said threshold value;
   wherein the display displays the regions of the document image having said color.

9. A computer readable medium having sequences of instructions for OCR output error detection, said sequences of instructions including sequences of instructions for performing the steps of:
   recognizing a plurality of characters in a document image;
   determining words from a sequence of said plurality of characters;
   determining regions of the document image that correspond to said words;
   correlating said words to said regions of said document image in a correlation table;
   determining a recognition confidence parameter for a plurality of words in said correlation table;
   defining a threshold level for said recognition confidence parameter; and
   displaying the regions of the document image containing a word having a recognition confidence parameter greater than said threshold level.

10. The computer readable medium of claim 9, wherein said sequences of instructions further include sequences of instructions for performing the steps of:
    receiving input that selects a region in the document image;
    determining a word from said correlation table that corresponds to said selected region; and
    displaying the word corresponding to said region.

11. The computer readable medium of claim 10, wherein the step of displaying the word includes the step of displaying the word in a pop-up menu.

12. The computer readable medium of claim 9, wherein said sequences of instructions further include the steps of:
    determining a color for the regions having a recognition confidence parameter less than said threshold value; and
    displaying the regions of the document image having said color.

* * * * *